United States Patent
Artés et al.

(10) Patent No.: US 9,298,183 B2
(45) Date of Patent: Mar. 29, 2016

(54) ROBOT AND METHOD FOR AUTONOMOUS INSPECTION OR PROCESSING OF FLOOR AREAS

(71) Applicant: RobArt GmbH, Linz (AT)

(72) Inventors: Harold Artés, Linz (AT); Dominik Seethaler, Linz (AT); Michael Schahpar, Linz (AT)

(73) Assignee: RobArt GmbH, Linz (AT)

(*) Notice: Subject to any disclaimer, the term of this patent is extended or adjusted under 35 U.S.C. 154(b) by 0 days.

(21) Appl. No.: 14/430,461

(22) PCT Filed: Sep. 24, 2013

(86) PCT No.: PCT/AT2013/050192
§ 371 (c)(1),
(2) Date: Mar. 23, 2015

(87) PCT Pub. No.: WO2014/043732
PCT Pub. Date: Mar. 27, 2014

(65) Prior Publication Data
US 2015/0212520 A1    Jul. 30, 2015

(30) Foreign Application Priority Data

Sep. 24, 2012 (DE) .......................... 10 2012 109 004

(51) Int. Cl.
*G05D 1/00* (2006.01)
*G05D 1/02* (2006.01)
*A47L 11/40* (2006.01)

(52) U.S. Cl.
CPC .......... *G05D 1/0022* (2013.01); *A47L 11/4011* (2013.01); *G05D 1/0219* (2013.01); *G05D 1/0274* (2013.01); *G05D 2201/0203* (2013.01)

(58) Field of Classification Search
USPC ............................................................ 701/2
See application file for complete search history.

(56) References Cited

U.S. PATENT DOCUMENTS

| | | | |
|---|---|---|---|
| 5,995,884 A | 11/1999 | Allen et al. | |
| 6,667,592 B2 * | 12/2003 | Jacobs ................ | G05D 1/0274 318/568.11 |

(Continued)

FOREIGN PATENT DOCUMENTS

| | | |
|---|---|---|
| EP | 1967116 | 9/2008 |
| EP | 2287697 | 2/2011 |

OTHER PUBLICATIONS

Durrant-Whyte et al., "Simultaneous localization and mapping (SLAM): Part I The Essential Algorithms," in:. IEEE Rotor Botics and Automation Magazine, vol. 13, No. 2, document of 10 pages, Jun. 5, 2006.

(Continued)

*Primary Examiner* — Thomas Tarcza
*Assistant Examiner* — Alex C Dunn
(74) *Attorney, Agent, or Firm* — Akerman LLP; Peter A. Chiabotti

(57) ABSTRACT

A mobile, self-propelling robot for carrying out activities autonomously is described. The robot can include a drive module for moving the robot over the floor surface, a processing module, a navigation module that navigates based on a map of the surroundings. The robot can also include a sensor module for sensing information relating to the structure of the surroundings, an analysis unit designed to determine the surface processed during a processing operation, to compare the surface and store information about a deviation therebetween, and a communication module to communicate the stored information about the deviation and thereby provide a user with the possibility of intervening, where on the basis of predefinable criteria it is decided whether information is to be communicated or not. The communication module can also receive a control instruction from the user and to interrupt, continue, modify or start again the processing operation.

17 Claims, 6 Drawing Sheets

(56) References Cited

U.S. PATENT DOCUMENTS

| | | | |
|---|---|---|---|
| 7,173,391 B2 | 2/2007 | Jones et al. | |
| 7,251,548 B2 | 7/2007 | Herz et al. | |
| 7,539,557 B2 * | 5/2009 | Yamauchi | G05D 1/0038 340/12.54 |
| 7,826,926 B2 * | 11/2010 | Myeong | G05D 1/027 318/568.12 |
| 8,382,906 B2 * | 2/2013 | Konandreas | A22C 17/0013 134/21 |
| 8,387,193 B2 * | 3/2013 | Ziegler | A47L 5/14 15/319 |
| 8,392,021 B2 * | 3/2013 | Konandreas | A22C 17/0013 318/568.1 |
| 8,474,090 B2 * | 7/2013 | Jones | A47L 5/30 15/319 |
| 8,670,866 B2 * | 3/2014 | Ziegler | A47L 5/14 123/350 |
| 8,755,936 B2 * | 6/2014 | Friedman | G08C 17/00 700/248 |
| 8,774,970 B2 * | 7/2014 | Knopow | A47L 5/28 15/319 |
| 8,843,245 B2 | 9/2014 | Choe et al. | |
| 9,026,302 B2 * | 5/2015 | Stout | G05D 1/0219 701/25 |
| 2003/0030398 A1 | 2/2003 | Jacobs et al. | |
| 2004/0207355 A1 | 10/2004 | Jones et al. | |
| 2004/0210359 A1 | 10/2004 | Herz et al. | |
| 2009/0182464 A1 | 7/2009 | Myeong et al. | |
| 2010/0313364 A1 | 12/2010 | Chung et al. | |
| 2011/0167574 A1 | 7/2011 | Stout et al. | |
| 2011/0264305 A1 | 10/2011 | Choe et al. | |
| 2012/0173070 A1 * | 7/2012 | Schnittman | G05D 1/0227 701/26 |

OTHER PUBLICATIONS

Bradshaw et al. "Dimensions of adjustable autonomy and mixed-initiative interaction," In Agents and Computational Autonomy: Potential, Risks, and Solutions. Lecture Notes in Computer Science, vol. 2969, document of 24 pages. Berlin, Germany: Springer-Verlag, Jan. 1, 2004.

* cited by examiner

ROBOT AND METHOD FOR AUTONOMOUS INSPECTION OR PROCESSING OF FLOOR AREAS

CROSS REFERENCE TO RELATED APPLICATIONS

This application is a §371 National Phase of PCT/AT2013/050192, filed Sep. 24, 2013, which claims priority to German Patent Application No. 10 2012 109 004.1, filed Sep. 24, 2012.

TECHNICAL FIELD

The present application describes to a method for autonomous inspection or processing of floor areas, in particular for inspecting or processing by means of an autonomous robot, for example.

BACKGROUND

Numerous self-propelled robots for cleaning or processing floor areas are known and are commercially available. In principle, the most complete possible processing of the floor area in the shortest possible time is to be achieved. In the case of simple systems, random navigation methods are used (for example, EP 2287697 A2 from iRobot Corp.), which manage without preparing or using a map of the environment, in which the floor area to be processed is located. This means that no location information with respect to obstructions, floor area boundaries, cleaned/non-cleaned regions, etc., is used. In combination with local movement strategies, the travel direction is merely (randomly) changed in the event of a collision with an obstruction. Thus, for example, repeated cleaning of floor areas is accepted, without guaranteeing (in finite time) a complete cleaning of the floor area.

More complicated systems prepare a map of the environment for targeted path planning and targeted cleaning of the floor area by means of a SLAM algorithm (SLAM: "simultaneous localization and mapping"). In this case, a map and the position of the robot in the map are ascertained by means of sensors, for example, laser range scanners, triangulation by means of camera and laser, contact sensors, odometric sensors, acceleration sensors, etc. In newer cleaning robots, which use such a SLAM module, the prepared map is non-permanent, i.e., a new map is prepared for each new cleaning operation (i.e., after completion of a preceding cleaning operation). In such systems, no map-based items of information are usually communicated to the user (for example, what was cleaned in which manner), and the user has no influence on the internal use of the map (for example, on a division of the floor area into regions to be processed and regions not to be processed).

In contrast to non-permanent maps, the use of permanently stored maps enables more efficient processing operations, since repeated exploration of the environment is not necessary. A processing operation can therefore be calculated beforehand. In this case, additional map-based items of information can be ascertained and reused (for example, problem regions, strongly soiled regions, etc.). For example, in EP 1 967 116 A1 the degree of soiling of a floor area is ascertained and stored in the map to adapt the processing intensity (for example, duration, frequency, etc.) accordingly during following processing cycles. In U.S. Pat. No. 6,667,592 B2 from Intellibot, for example, a stored/permanent map is used to assign (possibly different) functions (for example, vacuuming, wiping) to individual partial regions of a map, which can then be executed autonomously by a cleaning device. In US 2009/0182464 A1 from Samsung, the available map is divided into partial regions, which are subsequently cleaned sequentially.

However, the given circumstances in the region to be cleaned are frequently variable from one cleaning operation to the next. Thus, for example, persons or unknown objects (for example, shoes or bags) can be located in the region to be cleaned or furniture can be adjusted. This makes it difficult for the robot to carry out the processing completely autonomously. For this reason, an interaction between user and robot is provided in many systems. It is helpful in this case if the robot requests aid from the user in a targeted manner, for example, when it detects changed circumstances.

A cleaning system is described in U.S. Pat. No. 5,995,884 A, which represents the expansion of a computer. The computer manages a permanent map which it can update. The map is used as a basis for the cleaning. The computer represents an interface to the user, by means of which messages about possible obstructions can be output.

Methods are also known by means of which regions which are not accessible during a processing operation are omitted and can be made up at a later point in time in the same processing operation or in a subsequent processing operation. Such a method is described, for example, in WO 03/014852 A1.

A robot is described in US 2010/0313364 A1, which can clean regions, which it has possibly not processed during a processing trip, later in a post-processing trip.

A method is described in US 2011/0264305, in which a cleaning robot transmits a map about the region to be cleaned to an external device and in this manner allows for an interaction with the user.

However, the user typically either has no influence on the behavior of the robot in the event of eventual irregularities or non-accessible regions, for example, in the case of robot systems which operate entirely without maps or only with temporary maps, or the user must specify to the robot for each established irregularity how it is to proceed further.

Excessively frequent interaction or repeated interaction for the same problem is frequently perceived as annoying by the user. Too little interaction or a lack of interaction, in contrast, is frequently interpreted as a low intelligence of the robot.

The present disclosure provides an autonomous robot, which adapts the interaction to the needs and desires of the user and to the area of responsibility of the robot.

ABSTRACT OF THE INVENTION

The present application provides a mobile robot and a method having the features and structures set forth herein. Different examples and developments are specified in further features and structures set forth herein.

A mobile, self-propelled robot for autonomous execution of activities is described hereafter. According to one embodiment, the robot exhibits the following: a drive module for moving the robot across the floor area; a processing module for executing activities during a processing operation; a navigation module, which is designed to navigate the robot across the floor area during the processing operation on the basis of a map of the environment, and to store and manage one or more maps of the environment. The robot furthermore comprises at least one sensor module for acquiring items of information with respect to the structure of the environment; an analysis unit, which is implemented for the purpose of determining the area to be processed during a processing operation, comparing it to a reference, and storing items of information about a deviation between the reference and the actually processed area, and a communication module, which is implemented to establish, during, after completion, or after interruption of the processing operation, a connection to a human-machine interface, to communicate the stored items of information about a deviation between the reference and the actually processed area and therefore to give a user the option of engaging in the processing operation, making changes in the environment, or starting a renewed processing operation, wherein it is decided on the basis of specific, pre-definable criteria whether an item of information is to be communicated upon request by the user, without request, or not at all. The communication module is furthermore implemented for the purpose of accepting a control command from the user, to interrupt, continue, modify, or restart the processing operation.

Furthermore, a corresponding method for automatic execution of activities with the aid of a self-propelled, autonomous robot is described. The processing module does not necessarily have to process the floor area. Solely inspection or transport tasks can also be carried out. All mentioned modules do not have to be explicitly integrated into the mobile robot. For example, the analysis unit can also be implemented on a stationary computer, which can communicate with the mobile robot (for example, via radio).

The examples and technical features of the mobile robot which are described in conjunction with the processing of a floor area are also transferable, as mentioned, to a mobile robot for executing other or additional activities. The activities executed by the described mobile robot can comprise, for example, the processing of floor areas, the inspection of the floor area or the environment, the transport of objects, the filtering of air, and/or the execution of games. A processing module is not absolutely necessary, for example, in the case of use solely for inspection.

BRIEF DESCRIPTION OF THE FIGURES

The following figures and the further description are to help to understand the disclosure better. The elements in the figures are not necessarily to be understood as a restriction, rather, value is placed on illustrating the principle of the invention. In the figures, identical reference signs identify identical or similar components or signals having identical or similar significance. In the figures.

DETAILED DESCRIPTION

Figure 1:
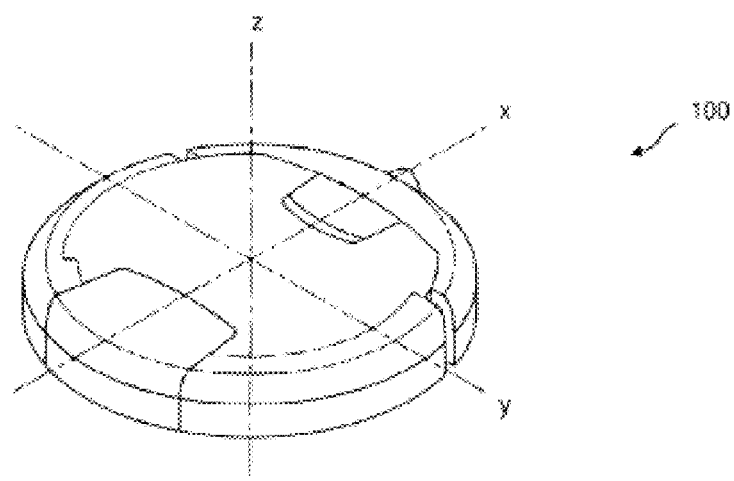
FIG. 1 shows an example of a schematic isometric illustration of a self-propelled robot for autonomous cleaning of floor areas.

FIG. 1 shows an example of a schematic isometric illustration of a self-propelled robot 100 for autonomous cleaning of floor areas. FIG. 1 also shows a Cartesian coordinate system having the origin in the center of the robot 100. Such devices are frequently—but not necessarily—implemented in a disk-shaped manner. The vertical axis z goes through the center of the disk. The longitudinal axis is identified with x and the transverse axis is identified with y.

The robot 100 comprises a drive module (not shown), which can have, for example, electric motors, gears, and wheels. The drive module can be implemented, for example, for moving the robot in the forward and reverse directions (in the illustration from FIG. 1, this would be along the x axis) and rotating it about the vertical axis (in the illustration from FIG. 1, this would be the z axis). Therefore, the robot can—theoretically—approach any point of a floor area (which is parallel to the plane defined by the x axis and the y axis). The robot furthermore comprises a processing module, for example, a cleaning module, which is implemented to clean the floor area located under (and/or adjacent to) the robot. For example, dust and dirt particles are vacuumed into a collection container or conveyed therein mechanically (or in any other manner). Such robots are known—per se—and essentially differ by way of the type of the navigation in the environment and the "strategy", which is applied during the processing of the floor area, for example, during a cleaning operation.

Robots are known, which manage without preparing or using a map. In such comparatively simple systems, random navigation methods are generally used. Location-related items of information, for example, items of information with respect to obstruction or orientation points, are not stored and reused during the processing operations. In combination with local movement strategies, such robots generally (randomly) change the travel direction in the event of collision with an obstruction. In this manner, floor areas in a region to be cleaned are in parts cleaned multiple times, while other floor areas are possibly not cleaned at all.

For this reason, more complicated, "smart" systems have been developed, which ascertain a map of the environment and simultaneously the corresponding position of the robot in this map, to thus make the robot as independent as possible and to achieve the best possible cleaning result, so that reworking by the user is only necessary to a limited extent or not at all. Such methods are known and are referred to as SLAM methods (simultaneous localization and mapping, see, for example, H. Durrant-Whyte and T. Bailey: "Simultaneous Localization and Mapping (SLAM): Part I The Essential Algorithms", in: IEEE Robotics and Automation Magazine, volume 13, issue 2, pages 99-110, June 2006). In this manner, targeted navigation is enabled. The map and the position of the robot in the map can be ascertained in this case by means of one or more sensors. In some known systems, a new map is prepared for every new cleaning operation, the maps are thus not permanent.

More efficient processing operations are possible using systems, in which the maps prepared by the robot are permanently stored and reused for following cleaning operations, in comparison to systems having temporary maps, since repeated exploration of the environment is not necessary. In addition, map-based items of information can be ascertained and reused. Thus, for example, strongly soiled regions can be marked in the map and specially handled during a following cleaning operation. User-specific items of information, for example, room names, can also be accepted. According to the examples of the present disclosure described here, the user can take influence on the processing operation, in particular in that he reacts to messages of the robot with respect to the processing operation or with respect to the environment. This interaction option or the benefits linked thereto for the user are to ensure that the acceptance of such robots is increased with consumers.

Figure 2:
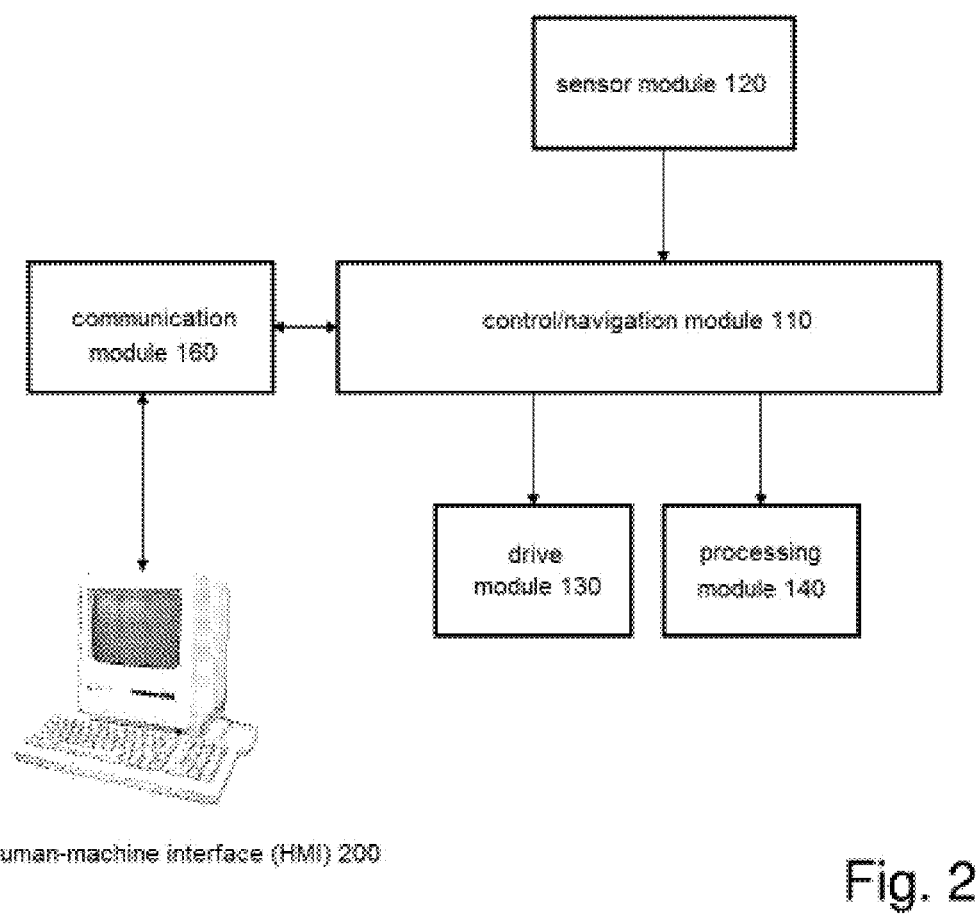
FIG. 2 shows an example of the structure of a robot for autonomous processing of floor areas on the basis of a block diagram.

FIG. 2 is a block diagram, which illustrates the schematic structure of an example of a robot 100 for autonomous processing (for example, cleaning) of floor areas. A drive module 130 and a processing module 140 are shown, which were already mentioned above. Both modules 130 and 140 are controlled by a control and navigation module 110. The navigation module 110 is implemented to navigate the robot across the floor area during a cleaning operation on the basis of a map of the environment. The map is stored in this case in a memory of the control and navigation module 110 in the form of map data. Different strategies for planning the set point trajectory of the robot are known for navigation in the environment. In general, the attempt is made to cover the floor area to be processed (for example, cleaned) as completely as possible using the shortest possible trajectory (path), to ensure comprehensive processing (for example, cleaning).

The robot 100 furthermore comprises a sensor module 120 for acquiring items of information with respect to the structure of the environment and/or with respect to properties of the floor area. For this purpose, the sensor module can have one or more sensor units, which are implemented to acquire items of information, on the basis of which a map of the environment can be constructed and the position of the robot on the map can be located. Suitable sensors for this purpose are, for example, laser range scanners, cameras, triangulation sensors, contact sensors for recognizing a collision with an obstruction, etc. As already described, a SLAM method can be used for constructing the map and for simultaneously determining the position of the robot within the map. The (temporary) map thus newly constructed and the permanent localization map corresponding thereto can be combined to recognize possible differences. Recognized differences can indicate an obstruction, for example. Persons located in a room can represent moving obstructions, for example (see below).

A communication connection to a human-machine interface 200 (HMI) can be established by means of a communication module 160. A personal computer (PC) comes into consideration in this case as the human-machine interface 200, however, it can also only be a simple display screen on the robot housing or a mobile telephone or smart phone. An external display screen, for example, a television, can also be part of the human-machine interface 200. According to one example of the present disclosure, the human-machine interface 200 enables the robot to communicate items of information with respect to the processing operation or with respect to the environment (i.e., items of map information) to the user and to request feedback (i.e., user feedback) from the user. The user can input a control command, for example, via a PC or via a button arranged on the robot housing. Of course, other variants of a human-machine communication are also known. This human-machine interface 200 enables stored items of information to be displayed with the corresponding positions in the map for a user, and therefore gives the user the possibility of intervening in the processing operation (or alternatively an inspection operation) or making changes of the environment. The human-machine interface 200 enables the processing operation (or the inspection operation) to be terminated, modified, continued, or restarted by way of the input of a control command by the user.

Figure 3:
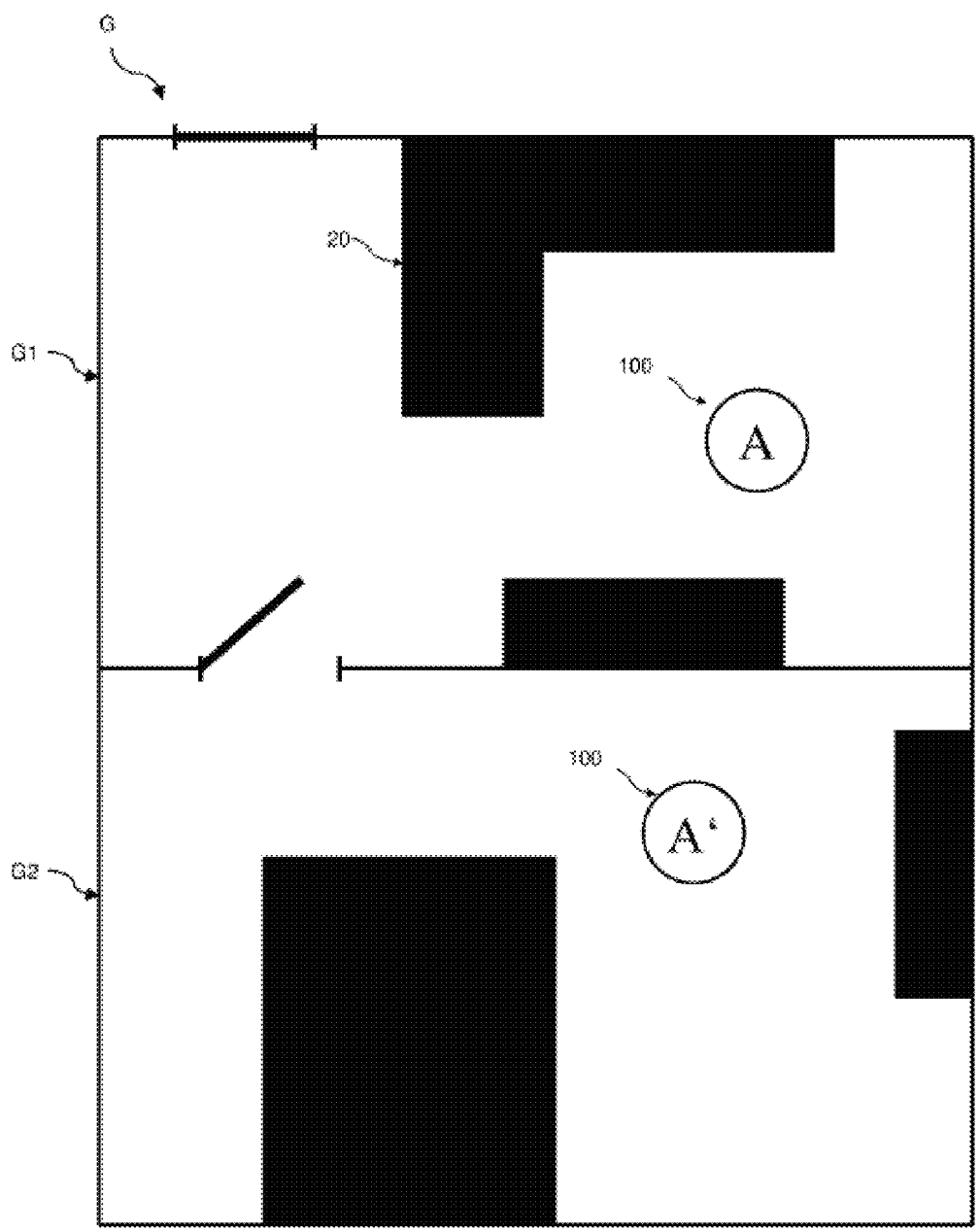
FIG. 3 shows an exemplary illustration of a self-propelled robot for autonomous cleaning of floor areas at various positions in a region to be cleaned.

FIG. 3 shows an example of an autonomous robot 100 at a position A inside a region G to be cleaned. The region G to be cleaned is divided in this case into various rooms G1 and G2, which are connected to one another by a door. In this case, various objects (black areas) can be located in the individual rooms G1, G2. The entire area G to be cleaned having the objects located therein can be stored in a map stored by the robot 100. During a processing operation, the robot 100 can then process the region G to be cleaned on the basis of the map.

During a normal processing operation, the robot will be able to process the entire region G to be cleaned, except for the regions below the objects. It can therefore move, for example, from the position A into the position A', to also carry out the processing in the second room G2.

Figure 4:
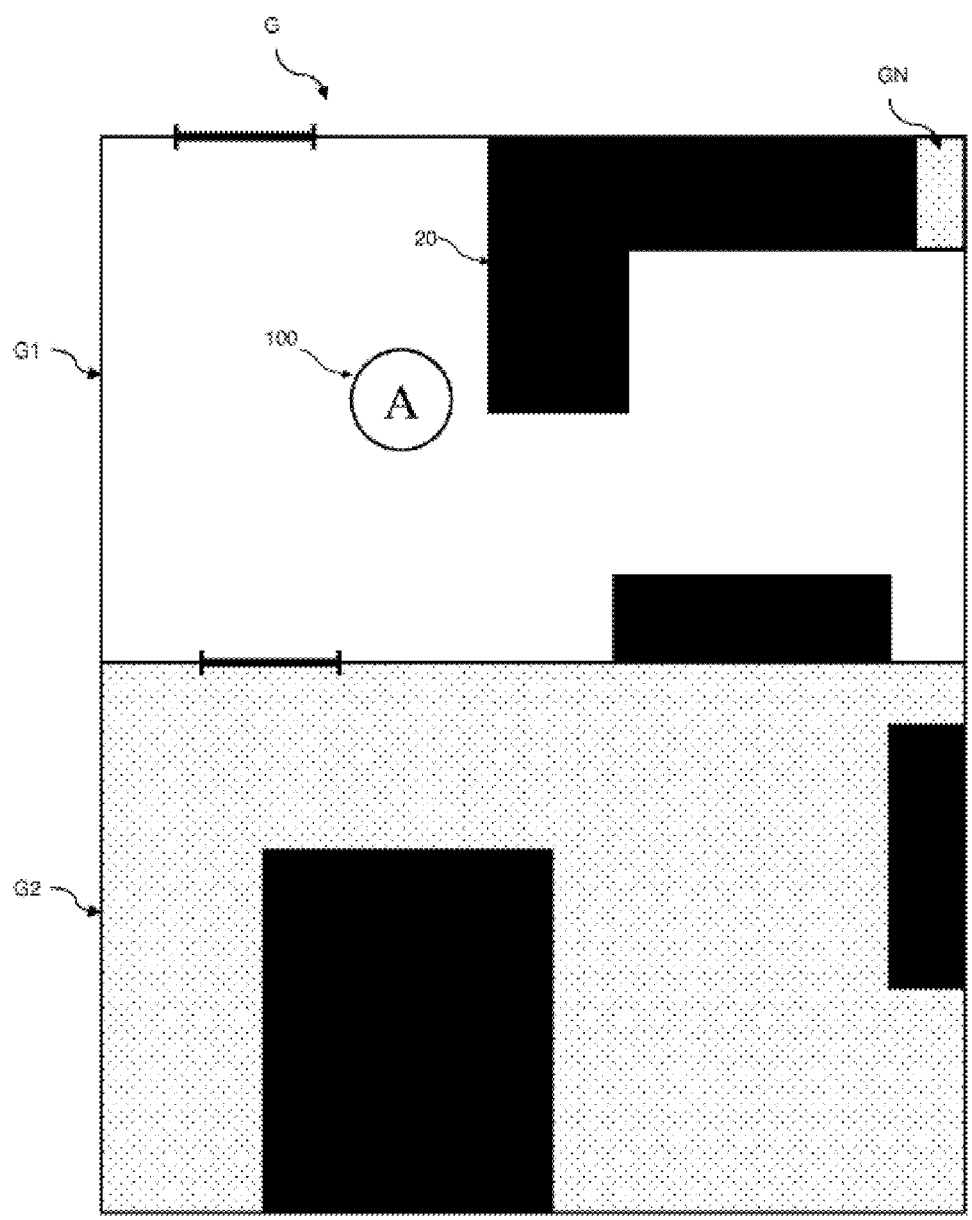
FIG. 4 shows an exemplary illustration of a self-propelled robot for autonomous cleaning of floor areas in a region to be cleaned, which has irregularities.

However, it can occur that, for example, objects are displaced, partial regions are blocked, or unknown objects, which are not recorded in the map, are located in the region G to be cleaned. This is shown as an example in FIG. 4. In this illustration, an object 20 is displaced in the first room G1 (in comparison to FIG. 3) such that processing of the region GN (shown by dotted lines) is no longer possible for the robot 100. In addition, the door to the second room G2 is closed, so that the robot 100 cannot travel into this room G2 (also shown by dotted lines) and processing is therefore not possible.

The sensor units, which deliver the environmental information required for constructing the map, can be used for the purpose, for example, of recognizing obstructions which are not yet recorded on an existing map. Contact sensors can detect a collision, it can be recognized, for example, via current sensors for measuring the load current of the drive unit when the robot hangs (for example, on the fringes of a carpet). Other sensor units can detect the robot getting stuck, for example, in that the drive wheels spin. Further sensor units can be provided, which are implemented, for example, for ascertaining the degree of soiling of the floor. The acquired items of environmental information can be transmitted together with a position of the robot assigned to the respective item of information on the map to the control and navigation module 110. Obstructions which suddenly "appear" at a point and "disappear" again after a short time can indicate movement in the room, for example, persons who are moving in the room. The robot can thus recognize, for example, whether persons are moving in a room and it can react thereto in particular.

The robot 100 can be implemented for the purpose of initiating an interaction with a user in a targeted manner, for example, to inform the user about incomplete floor coverage and enable him to remedy the circumstances for the incomplete coverage and to communicate to the robot, for example, which of the partial regions which were not processed are to be subjected to a processing attempt once again. Excessively frequent interaction can easily be perceived as annoying by the user in this case.

Figure 5:
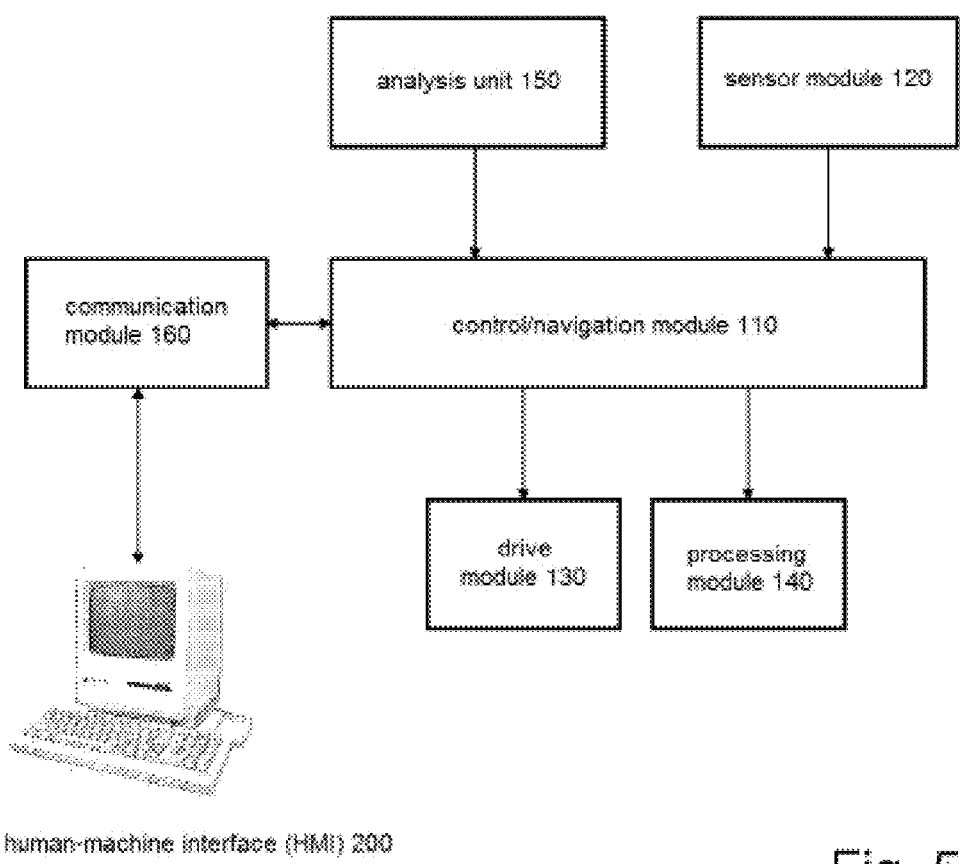
FIG. 5 shows an example of the structure of a robot according to the present disclosure for autonomous processing of floor areas on the basis of a block diagram.

FIG. 5 shows a further example of a robot for autonomous processing of floor areas. The robot differs from the example shown in FIG. 2 by way of an additional analysis unit 150. The analysis unit 150 can process various items of information, for example, and can decide on the basis of specific criteria whether or not an interaction is to be initiated with the user. If an interaction should be initiated, it can also be determined, for example, whether an interaction is to be performed only upon request by the user or independently by the robot. The behavior of the robot can be adapted in this manner to the given circumstances in the region G to be cleaned and to the desires and requirements of the user.

The analysis unit 150 can be implemented, as shown in FIG. 5, as an independent module. However, it can also be integrated in the navigation module 110, in the communication module 160, or any arbitrary component of the robot 100. In addition, it is also possible that the analysis unit 150 is not embodied in the robot 100, but rather, for example, in the human-machine interface 200 used (for example, in a computer or smart phone).

Figure 6:
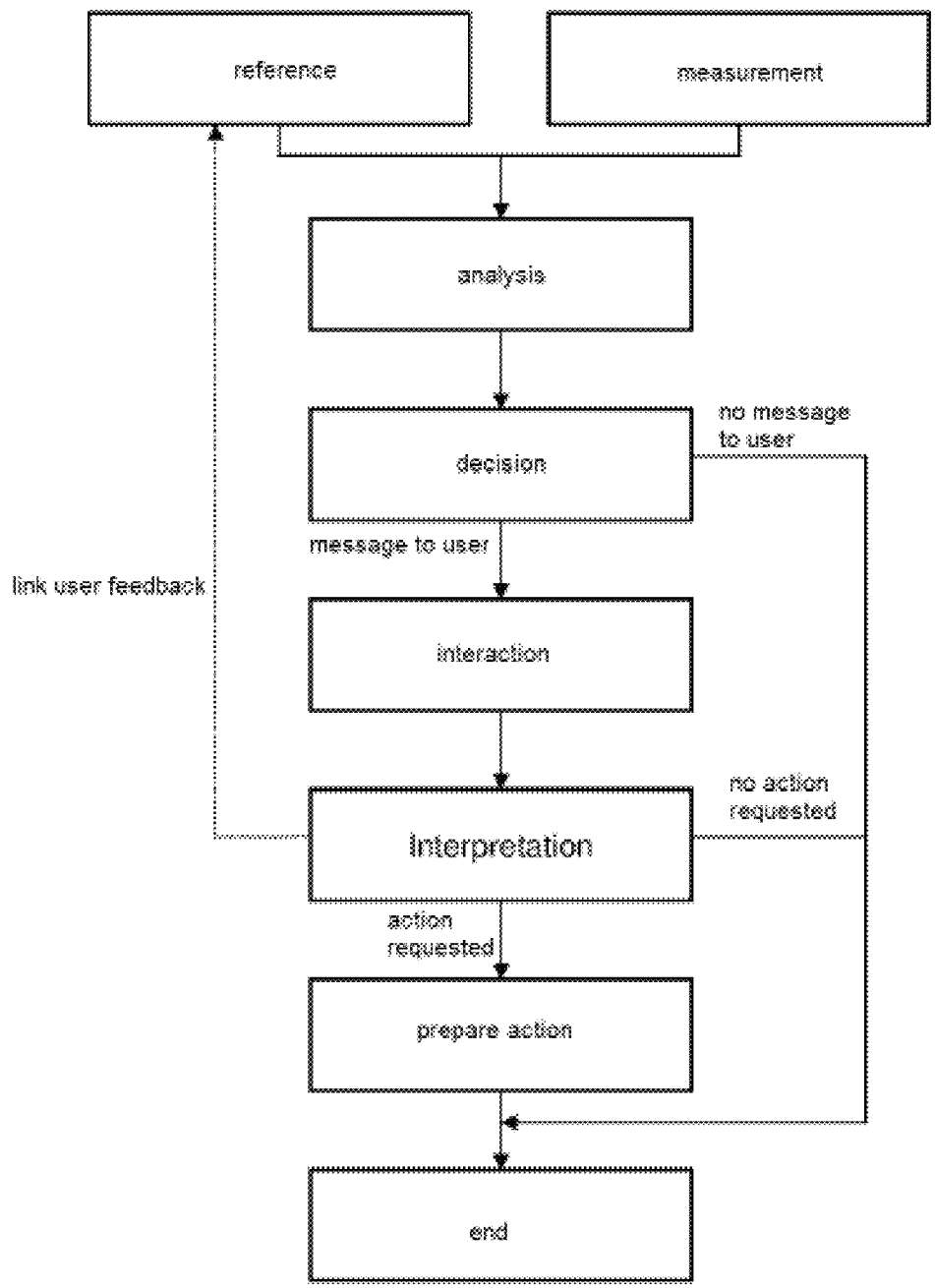
FIG. 6 shows an example on the basis of a flow chart of a method for processing floor areas with user interaction.

A method for adapting the behavior of the robot is shown as an example in FIG. 6. Firstly a reference can be made available to the robot, for example. This can specify to the robot the region to be cleaned and the desired coverage of the region to be achieved. The reference can, for example, be specified beforehand by a user in the form of a map, in which the regions to be clean are entered. However, the reference can also be prepared by the robot itself, for example, by an exploratory trip or as it carries out processing operations. A reference which is prepared in this manner or predefined by the user could also be adapted automatically by the robot if necessary, for example, on the basis of user interactions.

A reference in the form of a map could be, for example, a so-called feature map, in which the environment of the robot is assembled in abstract form from features. These features can then be assembled with the aid of logic rules to form objects. Such objects can be rooms or objects located in rooms, for example. As soon as such a map is available, an area to be achieved can then be calculated before a processing operation. By means of path planning, for example, all points in a room can be checked for accessibility from an instantaneous robot position.

During a processing operation, the robot can then carry out a measurement of the actually processed area. During this measurement, for example, the traveled area can also be logged. This can be performed, for example, on the basis of the stored map, however, also on the basis of a newly prepared map, for example, which can be compared to the provided map. The map type which is prepared during the measurement can be adapted to the map type of the stored map. For example, local regions can also be written with the aid of a grid map (a map which is decomposed with the aid of a network (grid)) and these local regions can be linked to a feature map. This can be performed, for example, in that the local regions are converted into "features" (for example, descriptions of the local region of approximated by a line or traverse) and incorporated into the feature map (in the simplest case, the endpoints of a line and the item of information that these points are associated with a line). However, simply also logging them in an existing grid map is also possible, for example, in that, for example, each grid point, the equivalent area of which was processed, is marked as processed.

In addition to the measurement of the floor coverage, which is essentially performed by also logging the processed area, further obstructions can be recognized during the processing. Furthermore, the environment can be "scanned" further, to recognize new objects. Thus, for example, a door can be recognized as such by object recognition, for example, by recognizing the door handle and with the aid of an image database. Detected objects can be entered in the map.

Incomplete processing of a region to be processed can be induced by the robot itself, for example, in that it independently terminates the processing of a region or partial region, for example. This can be the case, for example, if the robot detects (too many) people in a region, which could interfere with its processing or who could be disturbed by the robot by way of its processing. The reasons why the robot terminates the processing of a region can also be linked to the map. Such a linkage can be achieved, for example, in that corresponding objects (for example, a room, a part of a room, a piece of furniture), which consist of features, for example, are linked to reasons.

The measurement carried out of the floor coverage achieved during a processing operation can be used as the foundation for a subsequent analysis. In a subsequent analysis, for example, the reference and a performed measurement can be compared to one another. The provided data can be processed in this case and relevant (interesting) parameters (for example, the cleaned areas, non-cleaned areas, reasons for not cleaning) can be extracted. Carrying out such a comparison can be performed in greatly varying ways and can be carried out, for example, at the end of a processing operation and/or at one or more points in time during a processing operation. If the comparison is carried out during a processing operation, the comparison is thus restricted to regions for which the processing was already completed. For this purpose, the processed region can be segmented both in the reference and also in the present measurement into partial regions. A comparison can be started, for example, when the processing of a partial region is completed.

Greatly varying algorithms are known for carrying out the comparison. Such algorithms can be, for example, a grid point to grid point comparison, for example, upon the use of a reference and result grid map, or an incorporation of rule-based logic, to be able to acquire complex relationships. One advantage of a more complex analysis is, for example, that the updated measurement map can be interpreted again after each (partial) measurement operation. Thus, for example, on the basis of logical rules in a feature map, an obstruction can be recognized in hindsight as a closed door, for example, if the obstruction has completely blocked the passage to a room, for example. Therefore, for example, without using object recognition, a closed door can be recognized on the basis of logic or the detection of a door in a preceding measurement step can be verified.

During the analysis, for example, areas can be judged according to cost functions. In the case of a cleaning robot, for example, for the ith partial area $A_i$, the product of expected dirt pickup $S_i$ (can be known from previous processing operations) and (unprocessed) partial area $A_i$ can be calculated, from which a possible partial cleaning benefit $R_i$ results as follows:

$$R_i = A_i \cdot S_i \cdot W_i, \quad (1)$$

wherein $W_i$ is a weighting assigned to the ith partial area $A_i$ (see below). If one sets (by definition), for example, $S_i=1$ for all partial areas, the area benefit is obtained as a special case of the cleaning benefit. The integral (total) cleaning benefit R is obtained by adding up the partial cleaning benefits $R_i$ for all areas $A_i$ and all indices i in the set I:

$$R = \Sigma_{i \in I} R_i \quad (2)$$

A typically strongly soiled area therefore has a higher cleaning benefit than an area which is normally not very soiled. The "costs" for not cleaning are therefore high in the case of an area having high cleaning benefit. The cleaning benefit is an example of a general cost function which the robot is to minimize. It would also be possible, alternatively or additionally, to calculate in a processing risk of an area. A risk could be, for example, the robot remaining stuck on a slippery or slick surface. This risk could be taken into consideration, for example, by adapting the weighting factors (which can normally be set to 1). The cost function can be used as a criterion, to decide whether an item of information with respect to a processing operation, an obstruction, a recognized object, or the like is fundamentally to be communicated to the user only upon request by the user, without request, or not at all.

Such cost functions can be adapted and tailored, for example, by preceding user feedback. Thus, for example, upon repeated preceding user input that small unprocessed partial regions are not to be subjected to a further attempt at processing, this can result in a reduction (for example, by the weighting factors $W_i$) of the calculated possible benefit in the case of small areas.

For example, if the region of an apartment under a dining table is frequently blocked by chairs and is therefore not accessible to the robot, the user could communicate to the robot that he no longer wishes attention to be given to this region. However, the location of chairs and couches is frequently very different from one processing operation to the next in living spaces. Thus, for example, during one processing pass, the region under the dining table can be blocked, however, it can be partially or completely possible during a following processing operation. It can be ensured by the analysis, for example, that this region is recognized again as the dining region during each processing operation, to reliably prevent the user from not being informed.

In a feature map which is segmented into objects, this is possible, for example, in that a very fuzzy description of location, shape, and size is given to the abstract object "region under the dining table". In addition, for example, the object can also be linked with "chair obstructions". In this manner, the robot can identify, for example, unreachable regions in the living room, which are not accessible because of chair obstructions, as the dining region, which is not communicated to the user.

In some cases, it can occur that regions cannot be identified, because of the limited items of information which the robot can measure using its sensor elements. For this reason, for example, a detection probability can be calculated from the cost function. This detection probability can be increased, for example, with each discovery of an obstruction (for example, chair obstruction). The result of the analysis can also be a statistical description of the non-processed regions, for example.

During the analysis, for example, new items of information can also be concluded. Thus, for example, a door handle which is detected in the measurement step can be interpreted as a door to a previously undiscovered (and therefore unprocessed) region. During the analysis, it can also be taken into consideration, for example, that only a partial processing of the entire region to be processed was desired. This can be achieved, for example, in that the reference is adapted accordingly.

In the following step, a decision can be made, for example, about which items of information are communicated to the user and/or which feedback is expected from the user. By separating the steps of analysis and decision, more structure can be given to the method, for example, and more complex behavior patterns can be generated with less effort, for example. However, it is also possible, for example, to combine analysis and decision.

For example, with the aid of the data extracted during the analysis, decisions can be made during the decision with the aid of predefined rules. In a simple case, for example, a comparison of the calculated cleaning benefit to a threshold value (target value, for example, a defined fraction of the maximum possible cleaning benefit) can be carried out and a decision can be made based thereon. However, complex state machines can also be implemented. Thus, for example, a battery charge state of the robot could additionally be determined before a user is informed. The user could request immediate post-processing of an unprocessed area, which is possibly not possible with the given battery charge state, since it is too low. The robot could first inform the user in such a case when the battery charge state is sufficient for post-processing. It could also take into consideration the present time of day, for example. Thus, for example, immediately informing the user can be waived in the late evening or at night, and it can be shifted to the following day, for example.

It could also be checked, for example, whether the user is located in the house. This could be possible, for example, if the user is logged on to a local WLAN network (wireless local area network), as long as he is located in the house. Additionally or alternatively to the mentioned factors, a variety of further factors is also conceivable, on the basis of which a decision about whether and when a user is to be informed could be influenced.

During the interaction, data are processed for the user and relayed to the human-machine interface in dependence on the decision made. The type of the representation of the data can vary in this case in accordance with the type of the human-machine interface. Thus, for example, a map, in which the unprocessed regions are marked in color, for example, can only be displayed via a graphics-capable user interface, for example, via a smart phone application.

It is also possible to make the decision of the robot accessible to the user in multiple different ways simultaneously. Thus, for example, additionally to the above-mentioned color emphasis of the non-processed regions via a smart phone application, an email having a brief summary of the information could also be sent. In addition, the reason for incomplete processing can also be mentioned to the user if possible, to make it as simple as possible for the user to remedy the causes thereof, in order to enable a renewed attempt of the floor processing.

In addition to the information flow to the user, feedback can also be expected from the user. Since the type of the desired feedback can be dependent on the transmitted information, for example, the type of the expected response can also be communicated to the user. Thus, for example, only a confirmation can be expected for the message "Kitchen could not be cleaned since the door was closed. Please inform me as soon as I should clean the kitchen," while a map representation having partial regions can be expected in response to an item of information "Please mark the partial regions which I should process once again".

In addition, for example, the preceding decision can be communicated to the user during the interaction, for example, by emphasizing in color a partial region, about which the user did not wish to be explicitly informed, in a displayed map. In this manner, the possibility can be given to the user of correcting preceding feedback. The user could select the corresponding region in the map and erase an entry "do not communicate", for example.

During the interpretation, a decision can be made about an action of the robot or future decisions can be influenced in dependence on the user feedback. During the interpretation, for example, in the event of a positive response of the user (action requested) the sequence can continue to the next block or, in the event of a negative response (no action requested), the sequence can be terminated. However, it is also possible to link the response of the user to previous responses and to further rules, on the one hand, to decide which actions should be executed presently (for example, complete or partial post cleaning of a partial region) and, on the other hand, to make preparations for future interactions.

For example, if the user communicates to the robot to start a new processing attempt "later" for the non-processed partial regions, the robot could thus wait until the user is verifiably not in the building (for example, via a registration in a local WLAN network) and then initiate a new attempt. If a user has communicated repeatedly, for example, that he does not desire for regions which are less than the area of a shoe and are located in the foyer to be post-processed, the robot could adapt the analysis or the decision rules accordingly, so that the user is in future no longer "disturbed" by non-processed areas, which originate with high probability from shoes standing around in the foyer.

Alternatively, the user feedback can be stored in the reference map or can influence the reference map accordingly. Thus, for example, the abstract object "foyer" can be populated with the property: "do not report areas under 27 cm$^2$". In the same way, the foyer could manage entirely without the message, in that the reference to the foyer is set to "do not clean".

During the preparation of the action, the actions decided on by the method can be processed so that the robot can carry them out. The execution of actions can be dependent in this case on the capabilities of the robot. Thus, in this block if multiple unprocessed areas are present, for which a further processing attempt is to be started, for example, the following steps can be carried out: 1. Sorting the areas according to various criteria (for example, accessibility, risk of the processing attempt). 2. Path planning to the individual areas. 3. Transfer of the path list for execution to the robot.

The possible function of a robot 100 according to the present disclosure for autonomous processing of floor areas will be explained in greater detail hereafter on the basis of five exemplary cases.

First Example

During a processing operation (for example, triggered by a corresponding calendar setting of the user), the couch in the living room is shifted such that the region located behind it can no longer be approached or cleaned by the robot (for example, the couch was moved so close to the wall that the robot no longer has space between wall and couch). The user is out of the house during the processing operation and only comes back after completion of the processing operation. The robot cleans the remainder of the apartment, stores the present processing operation, and returns to its charging station.

Subsequently, the robot analyzes the map and ascertains whether a substantial cleaning benefit (i.e., an improvement of the "cleanness" of the apartment to be cleaned) could be achieved if the couch were shifted back to the original space. In the case in which a substantial cleaning benefit would occur, the robot informs the user (via the human-machine interface 200) about the non-cleaned regions of the apartment (in this example, the non-cleaned region behind the couch) and indicates a corresponding reason (for example, "region could not be approached—space insufficient").

The user then has the possibility of engaging in the cleaning process insofar as he shifts the couch back again so that the robot has sufficient space for cleaning Subsequently, the user can give the robot a "finish cleaning" command (via the human-machine interface 200, for example, a button on the robot). With the aid of the stored map of the environment and the information about the non-cleaned region, the robot can now attempt to approach the region behind the couch in a targeted manner and clean it. If the couch was shifted sufficiently, then, for example, (only) the region behind the couch is cleaned and therefore the cleaning operation of the entire apartment is completed.

Alternatively thereto, however, the user also has the possibility of informing the robot that in future he no longer wishes to receive a communication about the shifted couch. In this case, the robot can link this information to the object "couch" in the map, store it in the map, and in future no longer inquire in the event of shifting of the couch even if a significant cleaning benefit could be achieved. In addition, it is also possible by way of the linkage of the user interaction with parts of the map and the storage of this language to display to the user in the map the information that no communication is desired in the event of blocking in this region. In this manner, the user could process and possibly change these linkages at a later point in time.

By way of the information communicated by the robot, the user also knows, for example, that the robot can only reach the region behind the couch with difficulty or barely. To increase the success for future cleaning operations, the user now also has the possibility of making this region, which is difficult to access, more easily reachable for the robot. The robot could also learn from a simple input of the user, however, which behavior is expected from it in reference to items of information about obstructions and can take consideration thereof in future.

Second Example

During a cleaning operation, the space under the dining table is blocked with chairs, so that good cleaning coverage under the table is not possible. The robot omits this region and continues the cleaning at another point. After completion of the cleaning of the apartment, the robot returns to the base station. The analysis of the cleaning map in comparison to the stored map and to earlier cleaning results has the result that the omitted region is a typically strongly soiled region and therefore a greater cleaning benefit could be achieved. For this reason, the robot informs the user that the region under the table could not be cleaned, since the chair legs are too close together.

The user then has the possibility of making the region better accessible (for example: placing the chairs on the table) and prompting the robot to perform a renewed cleaning attempt of the omitted region with the aid of a "finish cleaning" button. Alternatively, however, the user could also conclude that he would rather clean this region by hand in general and could mark the region as an excluded region in the map. The robot will no longer attempt to approach the region in this case. Thus, for example, the risk can also be reduced of being stuck there.

Third Example

During a cleaning operation, the robot "discovers" that a door is closed or blocked. The robot cleans the remainder of the apartment and returns to its charging station. The analysis of the cleaning map carried out thereafter has the result that an entire room could no longer be approached and cleaned due to the closed door. Upon the query of the user (or on its own), the robot informs the user (via the human-machine interface 200) about the non-cleaned regions of the apartment in comparison to its last cleaning operations (in this case, the non-cleaned region corresponds to the closed room) and specifies a corresponding reason (for example, "Room could not be approached—door is closed").

The user now has the possibility of engaging in the cleaning process insofar as he opens the doors so that the robot can move into the room. Subsequently, the user can give the robot (again via the human-machine interface 200, for example, a button on the robot) a "finish cleaning" command. With the aid of the stored map of the environment and the information about the non-cleaned region, the robot can now attempt to approach and clean the room in a targeted manner. If this is successful, the cleaning operation of the entire apartment is therefore completed. To increase the success for future cleaning operations, the user now also has the possibility of ensuring that the door to this room is left open.

Alternatively thereto, the user can also communicate to the robot, for example (via the human-machine interface 200, for example, via a further button), however, that he only wishes this room to be cleaned when the door is open. In a dialogue following thereon, for example, he can also select, for example, that a further communication is only desired when the room has not been cleaned, for example, for more than a week (or another definable period of time). The robot can then link this information about the desired behavior to the corresponding map position and store it and in future proceed according to the wishes of the user.

Fourth Example

The robot terminates its current cleaning operation of the kitchen, since too many moving obstructions (for example, people) are delaying the cleaning operation for too long (for example, in relation to a predefined time specification). The robot cleans the remainder of the apartment, stores the current cleaning operation, and returns to its charging station. After the analysis of the cleaning map, the robot decides that it should inform the user that a substantial cleaning benefit would result by way of the cleaning of the kitchen. It transmits a message about the insufficiently cleaned regions of the apartment (in this case, the insufficiently cleaned region corresponds to the kitchen) to the user (via the human-machine interface 200) and specifies a corresponding reason (for example, "Region could not be sufficiently cleaned, too much movement").

The user can give the robot (via the human-machine interface 200, for example, a button on the robot) a "finish cleaning" command. The robot can now approach and clean the kitchen in a targeted manner. If this is successful, the cleaning operation of the entire apartment is thus completed. Due to the obtained information, the user now also knows that the robot can only clean the kitchen with difficulty at the original time (for example, because of too much human traffic). To increase the success for future cleaning operations, the user now has the possibility of changing the calendar setting of the robot, for example, such that, with high probability, fewer people will be in the kitchen during the newly selected time window.

In the case in which, for example, there is no more suitable point in time for the cleaning of this room, however, the user can also request the robot to clean the kitchen as well as possible in future in spite of movement. For example, the possibility would also exist of instructing the robot to process the region multiple times during a cleaning operation, to ensure better coverage in spite of movement. This information can then again be noted in the map and the robot can adapt itself in future to the desired behavior.

Fifth Example

A mobile robot is used to inspect devices set up in a building (for example, water dispensers, copier machines, coffee machines, lighting, etc.) or to search the building in general, for example, for unexpected objects or (unauthorized) persons. For this purpose, the mobile robot has already constructed a complete map of the environment during an earlier inspection. The robot cannot approach a room because a sliding door is stuck. The robot inspects the remainder of the building as much as possible, returns to its starting position, and informs the user (for example, the night watchman) via email, for example, via a wireless LAN interface (local area network) that a room could not be inspected. The user has the option of repairing the stuck door and causing the robot to continue the inspection, for example, via a response email.

In the fifth example, the human-machine interface 200 is formed, for example, by an email client on a computer and the communication module 150 is formed by the wireless LAN interface of the robot, which enables a communication via a (local) network with the user. Other embodiments of a human-machine interface 200 and a communication module 150 are possible, however.

The examples and technical features of the mobile robot described in conjunction with the processing of a floor area are also transferable to a mobile robot for executing other activities. All activities which can be assumed by autonomous self-propelled robots are conceivable in this case. These activities can comprise, for example, the inspection of the floor area or the environment, the transport of objects, the filtering of air, and/or the execution of games. The described processing module 140 is implemented accordingly in robots which execute activities other than or in addition to the processing of floors. In some cases, a processing module 140 is not necessary, for example, in the case of solely monitoring or inspecting rooms, areas, or objects.

While the present disclosure was described on the basis of an exemplary embodiment, the present disclosure may accordingly additionally be modified within the basic idea and the scope of protection of this disclosure. The present application is therefore to cover numerous variants, possible uses, or adaptations of the present disclosure using the fundamental principles thereof. In addition, the present application is intended to cover such deviations from the present disclosure which represent known or common practice in the prior art, on which the present disclosure is based. The present disclosure is not restricted to the above-specified details, but rather may be modified according to the appended claims.

The invention claimed is:
1. A mobile self-propelled robot for autonomously executing activities, the robot comprising:
   a drive module for moving the robot across a floor area;
   a processing module for executing the activities during a processing operation;
   a navigation module, wherein the navigation module is implemented to navigate the robot across the floor area during the processing operation based on a map of an environment, and wherein the navigation module stores and manages the map of the environment;
   a sensor module for acquiring items of information relating to a structure of the environment;
   an analysis unit, wherein the analysis unit is implemented to determine the floor area processed during the processing operation, wherein the analysis unit compares the floor area processed during the processing operation to a reference, and wherein the analysis unit stores items of information about a deviation between the reference and the floor area processed during the processing operation; and
   a communication module, which is implemented to establish during, after completion, or after interruption of the processing procedure, a connection to a human-machine interface, in order to communicate the items of information about the deviation between the reference and the floor area processed during the processing operation to give a user a possibility of intervening in the processing operation, making changes to the environment, or starting a renewed processing operation, wherein whether the item of information is communicated upon request by the user, without request, or not communicated is based on specific, pre-definable criteria;

wherein the communication module is further implemented to accept a control command from the user to interrupt, continue, modify, or restart the processing operation.

2. The robot according to claim 1, wherein the reference can be input into the robot and changed by a user and/or the robot can independently prepare a reference and change an existing reference.

3. The robot according to claim 2, which is implemented to prepare or change the reference by analyzing a preceding processing operation, a preceding control commands of the user, or both the preceding processing operation and the preceding control commands of the user.

4. The robot according to one of claim 1, wherein the analysis unit determines the floor area processed during a processing operation by logging a travel path.

5. The robot according to claim 1, wherein, during the processing operation, the items of information relating to the structure of the environment are continually acquired by the sensor module and the items of information relating to the structure of the environment are analyzed and classified.

6. The robot according to claim 4, wherein the determination of the processed area is carried out during or at the end of the processing operation.

7. The robot according to claim 1, wherein the analysis unit determines a cleaning benefit, an area benefit of a non-processed area, or both the cleaning benefit and the area benefit of a non-processed area.

8. The robot according to claim 1, wherein the analysis unit judges areas according to a cost function (R).

9. The robot according to claim 8, wherein the cost function can be adapted by previous user feedback.

10. The robot according to claim 8, wherein criteria, to decide whether the item of information is to be communicated upon request by a user, without request, or not at all, are a cleaning benefit, an area benefit of a non-processed area or the cost function (R) of an area.

11. The robot according to claim 1, wherein a partial cost function associated with non-cleaned partial area is calculated and an overall cost function is formed therefrom, wherein whether and in which way contact is made with the user via the human-machine interface is decided based on the overall cost function.

12. The robot according to claim 1, wherein the stored items of information about a deviation between the reference and the floor area processed during the processing operation are communicated by transmission to a mobile telephone, a smart phone, a computer, a television, a display screen, or a combination thereof.

13. The robot according to claim 1, wherein the communication of the items of information about a deviation between the reference and the floor area processed during the processing operation contains items of information about a reason for not processing, about previous user feedback, or a combination thereof.

14. The robot according to claim 1, wherein user feedback is stored in the map of the environment.

15. The robot according to claim 1, wherein the analysis unit determines, on the basis of specific criteria, whether items of information about a deviation between the reference and the floor area processed during the processing operation are communicated immediately or at a later point in time.

16. The robot according to claim 15, wherein criteria for later communication of items of information are a time of day, a battery charge state, the absence of the user, previously input user feedback, or a combination thereof.

17. A method for automatically executing activities with the aid of a self-propelled autonomous robot; the method comprising:

storing and managing a map of an environment;

starting a processing operation and executing the activities with aid of a processing module arranged on the robot;

navigating the robot across a floor area during the processing operation based on the map of the environment;

acquiring items of information with respect to structure of the environment during the processing operation by way of a sensor module arranged of the robot;

determining the floor area processed during the processing operation;

comparing the floor area processed during the processing operation to a reference;

ascertaining items of information about a deviation between the reference and the floor area processed during the processing information; and deciding on the basis of specific criteria whether the items of information about the deviation between the reference and the floor area processed during the processing information are to be communicated upon request by a user, without request, or not at all.

* * * * *